V. E. HILLMAN.
CONNECTING ROD.
APPLICATION FILED MAR. 17, 1919.
1,323,391.
Patented Dec. 2, 1919.
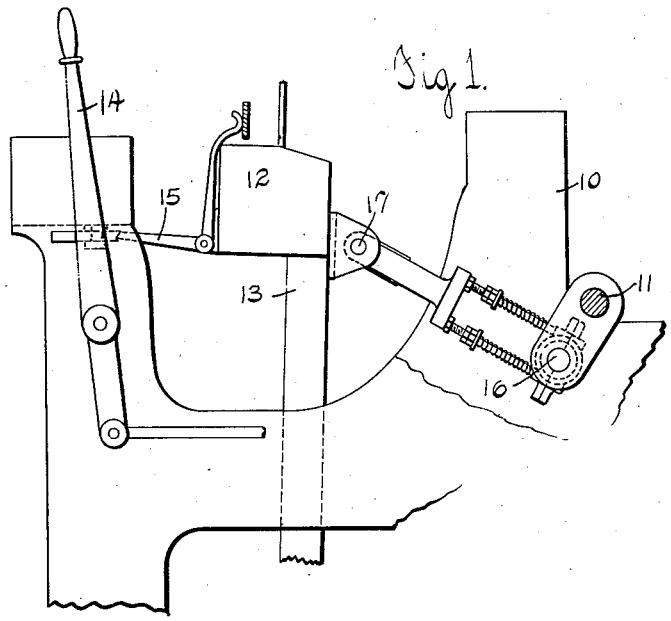
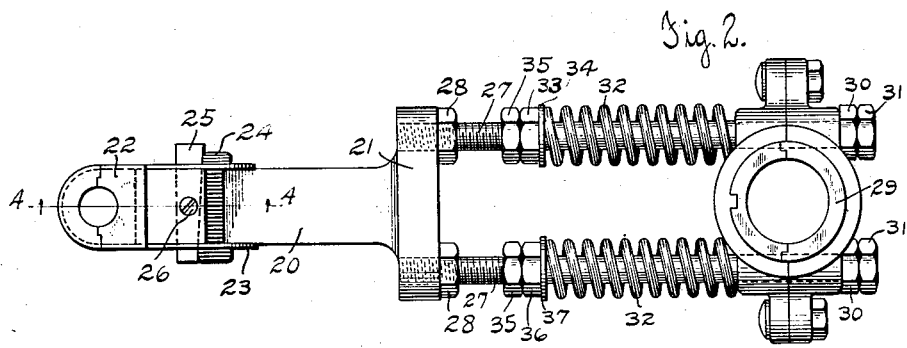
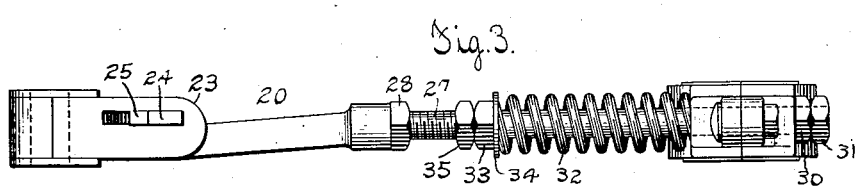
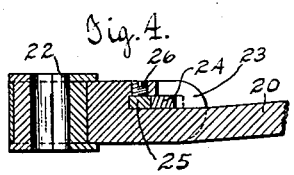
Inventor
Victor E. Hillman
Southgate & Southgate
Attorneys

UNITED STATES PATENT OFFICE.

VICTOR E. HILLMAN, OF WORCESTER, MASSACHUSETTS, ASSIGNOR TO CROMPTON & KNOWLES LOOM WORKS, OF WORCESTER, MASSACHUSETTS, A CORPORATION OF MASSACHUSETTS.

CONNECTING-ROD.

1,323,391.      Specification of Letters Patent.      Patented Dec. 2, 1919.

Application filed March 17, 1919. Serial No. 283,114.

*To all whom it may concern:*

Be it known that I, VICTOR E. HILLMAN, a citizen of the United States, residing at Worcester, in the county of Worcester and State of Massachusetts, have invented a new and useful Connecting-Rod, of which the following is a specification.

This invention relates to a connecting rod which is adapted to yield whenever the movement of the driven member is obstructed.

While particularly designed for use on certain types of looms, it is also capable of general application.

It is the object of my invention to improve the construction of connecting rods of this type to the end that they may be more durable and efficient in operation, and more easily repaired when repairs become necessary.

With this general object in view, my invention in its preferred form comprises a connecting rod having a body member with a cross arm or head into which a pair of parallel guide rods are threaded or otherwise detachably secured. These rods yieldingly support one of the bearings of the connecting rod, the other bearing being supported by the body member itself.

My invention further relates to certain arrangements and combinations of parts hereinafter described and more particularly pointed out in the appended claims.

A preferred form of my invention is shown in the drawings, in which—

Figure 1 is a side elevation of certain parts of a loom with my invention embodied therein;

Fig. 2 is an enlarged side elevation of my improved connecting rod;

Fig. 3 is a plan view thereof, and

Fig. 4 is a sectional detail taken along the line 4—4 in Fig. 2.

Referring to the drawings, I have shown my improved connecting rod applied to a loom having a frame 10, a crank shaft 11, a lay 12 mounted on lay swords 13, a shipper rod 14, and the usual protector device 15. My improved connector is interposed between a crank pin 16 on the shaft 11 and a stud 17 mounted on the back of the lay 12.

The connecting rod shown in the drawings comprises a body member 20 having a cross arm or head 21, preferably formed integral therewith. A bearing 22 is firmly secured to the member 20 in any convenient manner as by a strap 23, a locking member 24, and a wedge key 25, the latter being held in adjusted position by a set screw 26. The bearing 22 and the parts used for securing the same to the body member 20 may be of any usual form and the details thereof constitute no part of my invention.

A pair of parallel guide rods 27 are fixed in the cross arm or head 21, preferably being threaded therein and being provided with lock nuts 28. A second bearing 29 is slidably mounted upon the rods 27 and outward movement thereof is limited by adjusting nuts 30 and lock nuts 31. A spring 32 is mounted on each rod 27, being interposed between the bearing 29 and a nut 33 and washer 34. A lock nut 35 is provided to retain the nut 33 in adjusted position.

It will be seen that the distance between the bearings 22 and 29 can be accurately adjusted by means of the nuts 30 and 31, and that the strength of the springs 32 is determined by the position of the nuts 33 and 35. It will also be noted that the body member 20 is offset and recessed as shown in Fig. 4 to avoid the necessity of slotting the member to receive the locking member 24 and the key 25.

In the application of my invention shown in the drawings, the springs 32 permit the bearing 29 to slide on the rods 27 whenever the forward movement of the lay is prevented by a misplaced shuttle or for any other reason.

While I do not wish to be limited to particular materials from which to construct my improved connecting rod, I have found that the body member 20 may desirably be forged from wrought iron or mild steel, while the rods 27 may advisedly be formed from a higher grade of steel which is susceptible to suitable heat treatment, as it has been found that any injury to this type of connecting rod is commonly confined to one or both of the rods 27. In my present construction a broken or injured rod can be readily removed and replaced without removing the whole connecting rod from the machine in which it is mounted.

Having thus described my invention, it will be evident that changes and modifications may be made therein by those skilled in the art without departing from the spirit and scope thereof as set forth in the claims, and I do not wish to be otherwise limited to the details herein disclosed, but what I do claim is—

1. A connecting rod comprising a body member having a head, a pair of guide rods detachably fixed in said head, a bearing slidably supported thereon, and springs on said rods yieldingly engaging said bearing.

2. A connecting rod comprising a body member having an integral cross arm, a pair of parallel guide rods threaded into said cross arm, a bearing slidable on said rods, means to limit outward movement of said bearing, springs to force said bearing outwardly, and means to adjust said springs.

3. A connecting rod comprising a body member having both a bearing and a head fixed thereto, a movably mounted bearing, guides therefor fixed in said head, means to positively limit outward movement of said bearing, devices to yieldingly resist inward movement thereof, and means to adjust said devices.

In testimony whereof I have hereunto affixed my signature.

VICTOR E. HILLMAN.